UNITED STATES PATENT OFFICE.

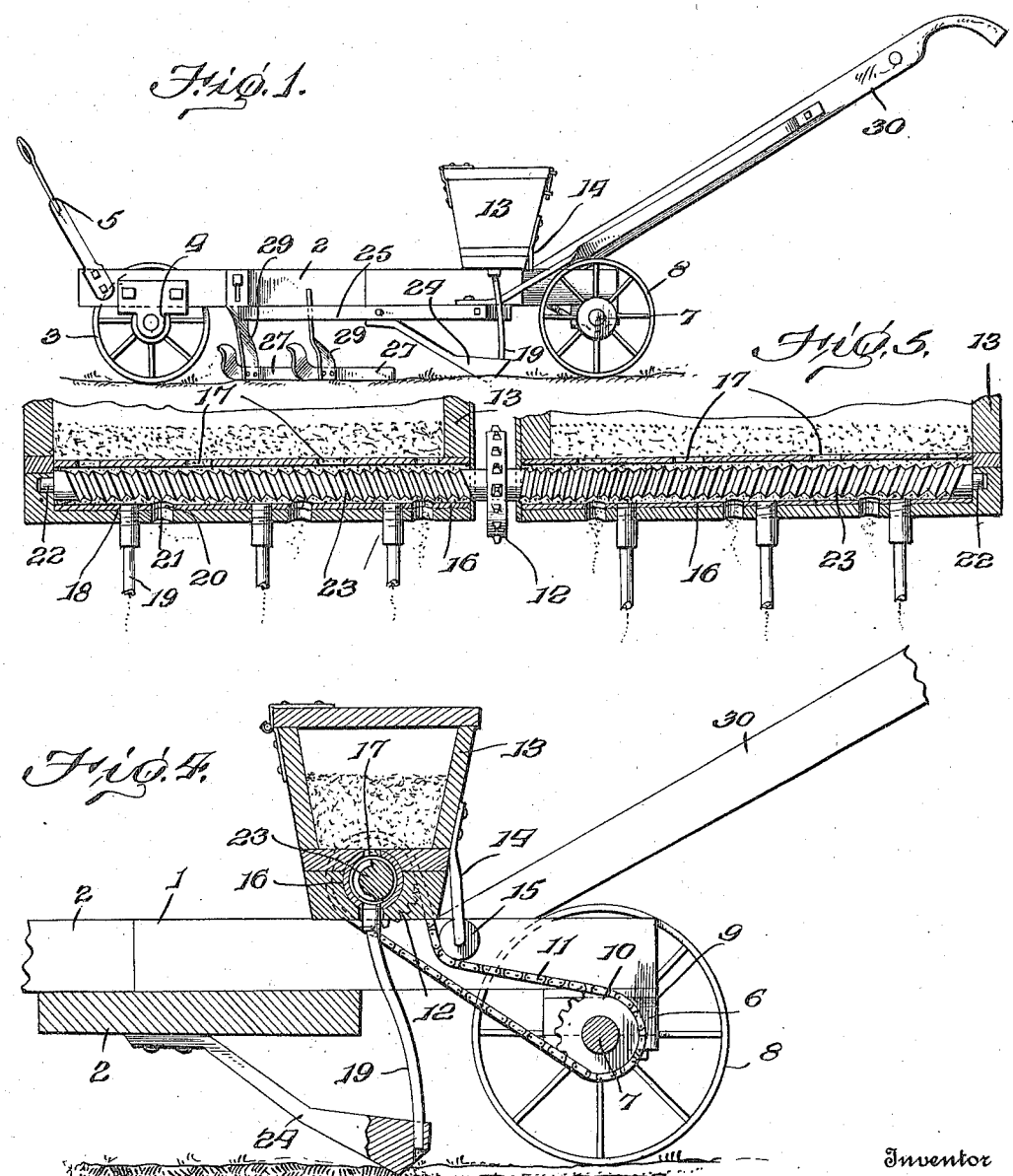

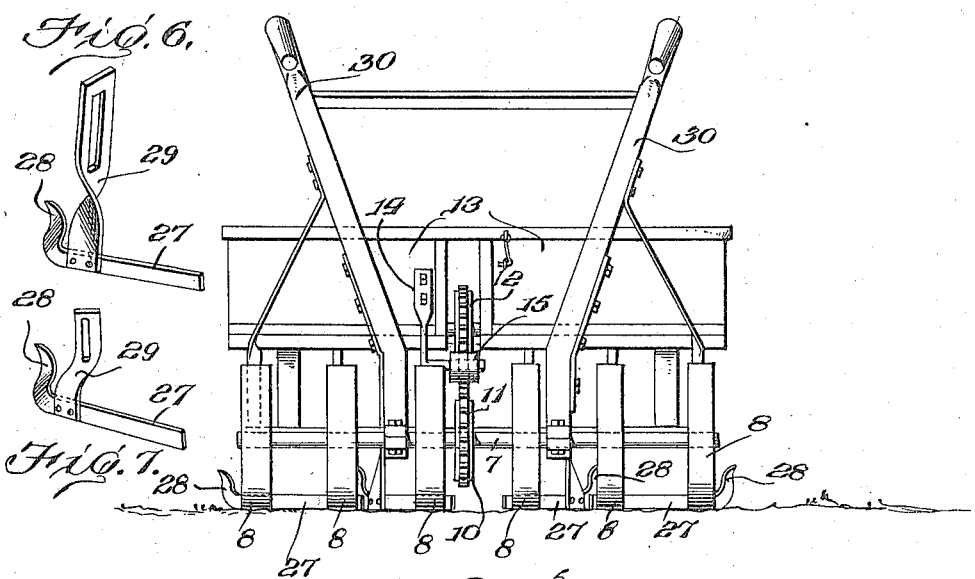
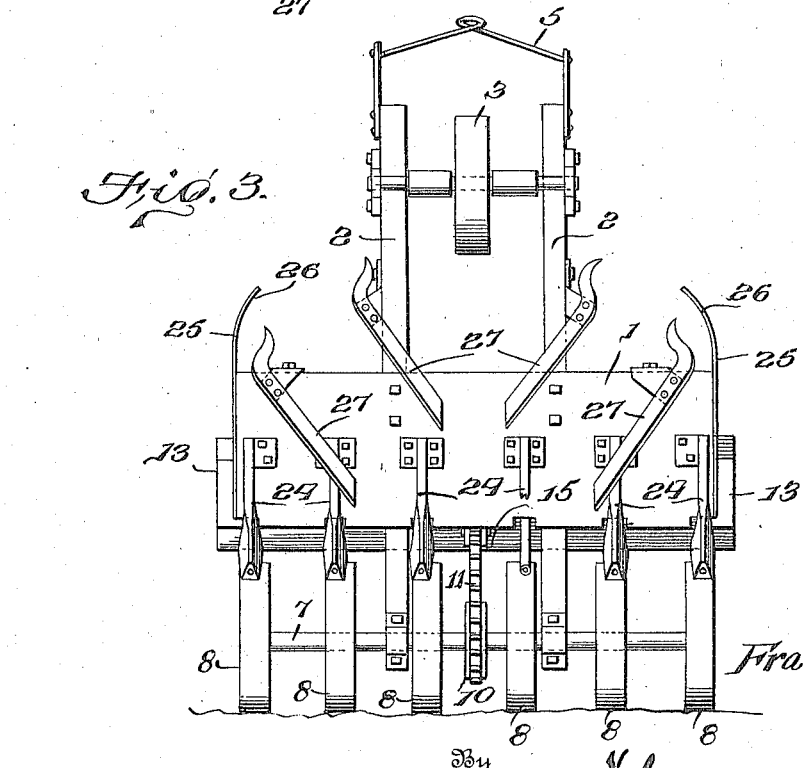

FRANK SHERWIN, OF BROOKINGS, SOUTH DAKOTA.

SEED-DRILL.

1,181,930. Specification of Letters Patent. Patented May 2, 1916.

Application filed September 9, 1915. Serial No. 49,794.

*To all whom it may concern:*

Be it known that I, FRANK SHERWIN, a citizen of the United States, residing at Brookings, in the county of Brookings and State of South Dakota, have invented certain new and useful Improvements in Seed-Drills, of which the following is a specification.

This invention relates to seed planters and has for its object the provision of a machine which is especially adapted for planting in drills alfalfa and similar seed between rows of growing corn and in other specially prepared ground.

One object of the invention is to provide improved means for discharging the seed, and other objects of the invention are to provide means whereby the soil will be presented to the action of the drills in a smooth or level condition, and to provide means whereby the machine may be driven between rows of corn without injury to the growing plants.

Other incidental objects of the invention will appear as the description of the same proceeds, and the invention resides in certain novel features of a machine such as is illustrated in the accompanying drawings.

In the drawings: Figure 1 is a side elevation of a planter embodying my present improvements; Fig. 2 is a rear elevation of the same on a somewhat larger scale; Fig. 3 is a bottom plan view; Fig. 4 is a vertical longitudinal section; Fig. 5 is a detail transverse section through the seed feeding mechanism; Figs. 6 and 7 are detail perspective views of the levelers.

In carrying out my invention, I employ a frame which may be of any convenient construction and is illustrated as consisting of a transversely disposed plank or base 1 and longitudinal beams 2 secured to the said base and projecting forwardly and rearwardly therefrom. Between the forward ends of the beams 2, I mount a wheel 3 which supports the forward end of the frame and is mounted in bearings 4 which may be adjustably secured to the beams so as to permit the said wheel to run any desired height and, therefore, aid in regulating the depth to which the shoes may penetrate. A yoke, clevis, or other draft device 5 is secured to the front ends of the beams 2 to permit the application of power so that the machine may be driven over the field.

Secured to the rear ends of the beams 2 are bearings 6 in which is journaled an axle or driving shaft 7, presser wheels 8 being secured to the said axle and adapted to run upon the ground as will be readily understood. These presser wheels may be adjusted so as to be higher or lower relative to the frame, and thereby regulate the depth of penetration of the shoes, by inserting liners or washers 9 between the tops of the severel bearings and the under side of the frame, as will be readily understood. At the center of the axle, I secure, by a set screw or other convenient means, a sprocket wheel 10 around which is trained a chain 11 which also passes around a similar sprocket wheel 12 arranged between the hoppers or seed boxes 13 which are secured upon the frame. A bracket 14 is secured to the rear side of one of the seed boxes and carries an idler 15 which is arranged to bear upon the upper run of the chain 11 and thereby hold the same taut so that power will be properly transmitted at all times from the axle to the seed feeding shaft. The hoppers 13 are disposed transversely upon the frame and in the bottoms of the hoppers, I secure tubes 16 which extend from end to end of the hoppers and are provided in their upper portions with openings 17 which permit the seed to flow from the hopper to the interior of the tubes. In the under side of each tube and spaced inwardly from the inlet openings 17 are outlet openings 18 which receive the upper ends of the seed spouts 19, as shown and as will be readily understood. Adjacent each outlet opening 18 and between the same and the inner end of the tube is a vent or relief opening 20 which registers with a similar opening 21 in the bottom of the main frame. The sprocket wheel 12 is secured rigidly to the seed conveyer at the center of the same and is thereby disposed between the inner ends of the hopper. The said conveyer consists of a cylindrical rod constructed with journals 22 and having its surface between its ends and its central portion provided with a coarse thread, indicated at 23, which is so disposed in the present illustration as to feed from the ends of the rod toward the center of the same. It will thus be readily understood that, when the rod is rotated, the screw thereon will act upon the seed passing through the opening 17 so as to feed the same toward the outlet openings and, when the seed reaches the said outlet openings, it will at once drop through the same and the spouts 19 to the ground. The lower ends of the seed spouts are secured in the rear ends of the planter shoes or runners 24 which take into the ground and open a small furrow to receive the seed. Should the rear end of the shoe and the lower end of the seed spout become clogged with dirt, the seed will accumulate in the spout until the same is filled and the continued operation of the machine will then cause the seed to escape through the relief openings 20 and 21 and drop to the ground in sight of the driver who may then, of course, stop the machine and clear the obstructed seed spout.

The presser wheels 8 correspond in number to the seed spouts and the shoes and will run directly behind the same so as to cover the seed and press the surface soil down onto the same.

It will be noted that the driving mechanism is located in the central longitudinal plane of the machine so that torsional or twisting strain is avoided and the seed feeding shaft or conveyer will operate smoothly and easily at all times.

To prevent injury to the growing corn between which the machine is driven, I secure to each side of the main frame a fender 25 which projects forwardly and has its free extremity 26 curved inwardly toward the central plane of the machine so that a growing plant which may happen to be in the path of the machine will be shoved lightly aside to permit the machine to pass without injury to the plant.

In order that the irregularities in the surface of the soil may be removed before the seed spouts and shoes reach the same, I provide leveling devices, shown in Figs. 6 and 7. These devices consists of blades or scrapers 27 which have their front ends upturned, as shown at 28, and the said scrapers or blades are disposed at an angle to the line of draft, as shown most clearly in Fig. 3, so that the loose soil will be deflected toward the central longitudinal line of the machine and deposited in the hollow between the rows of growing plants. The soil will thus be pulverized and spread evenly so that a proper bed for the seed will be provided. To each blade or runner 27 is secured a vertically slotted bracket 29 which rises therefrom and is adapted to be secured to the frame of the machine, the vertical slots permitting the scrapers to be set at any desired height as will be readily understood. The machine is provided with the usual steering handles 30 by which it may be guided.

It is thought the operation and advantages of my improved planter will be readily understood from the foregoing description taken in connection with the accompanying drawings. The hoppers are filled with seed and the machine is then drawn over the field between the rows of growing corn. Motion will be imparted to the axle through the ground or presser wheels 8 and this motion will be transmitted through the described gearing to the seed conveyer, which will be rotated so as to force the seed escaping from the hoppers toward the exit openings and the tubes 16, from which tubes the seed will escape in the manner before stated.

My machine is especially adapted for planting alfalfa, clover, or similar seed between rows of corn and will be highly efficient for that purpose, and also for sowing such seeds on any specially prepared ground.

Having thus described the invention, what is claimed as new is:

1. A planter comprising a frame, wheels supporting the same, hoppers on said frame, seed spouts depending from said hoppers, and levelers depending from the frame in advance of the seed spouts and converging rearwardly toward the central longitudinal line of the machine.

2. The combination with a planter frame, of brackets secured thereto and depending therefrom, and leveler blades secured to the lower ends of said brackets and having their front ends upturned and their rear ends disposed inwardly with respect to their front ends.

3. In a planter, the combination of a hopper, a tube extending from end to end of the hopper at the bottom of the same and provided in its upper side with inlet openings and in its lower side with outlet openings and relief openings adjacent the respective outlet openings, seed spouts secured in and depending from said outlet openings, and means for feeding the seed longitudinally of the tubes from the inlet openings.

4. The combination of a planter frame, hoppers secured transversely thereon and spaced apart at their inner ends, an axle mounted in the frame in rear of the hoppers, seed-discharging tubes extending from end to end of the hoppers at the bottom of the same and provided in their upper sides with inlet openings and in their lower sides with outlet openings out of vertical alinement with the inlet openings, a seed-feeding shaft disposed in the tubes and extending between the inner ends of the hoppers, means acting upon said shaft between the hoppers to operate the same, and seed spouts depending from the hoppers in vertical alinement with the outlet openings in the seed-discharging tubes.

In testimony whereof I affix my signature.

FRANK SHERWIN. [L. S.]